UNITED STATES PATENT OFFICE.

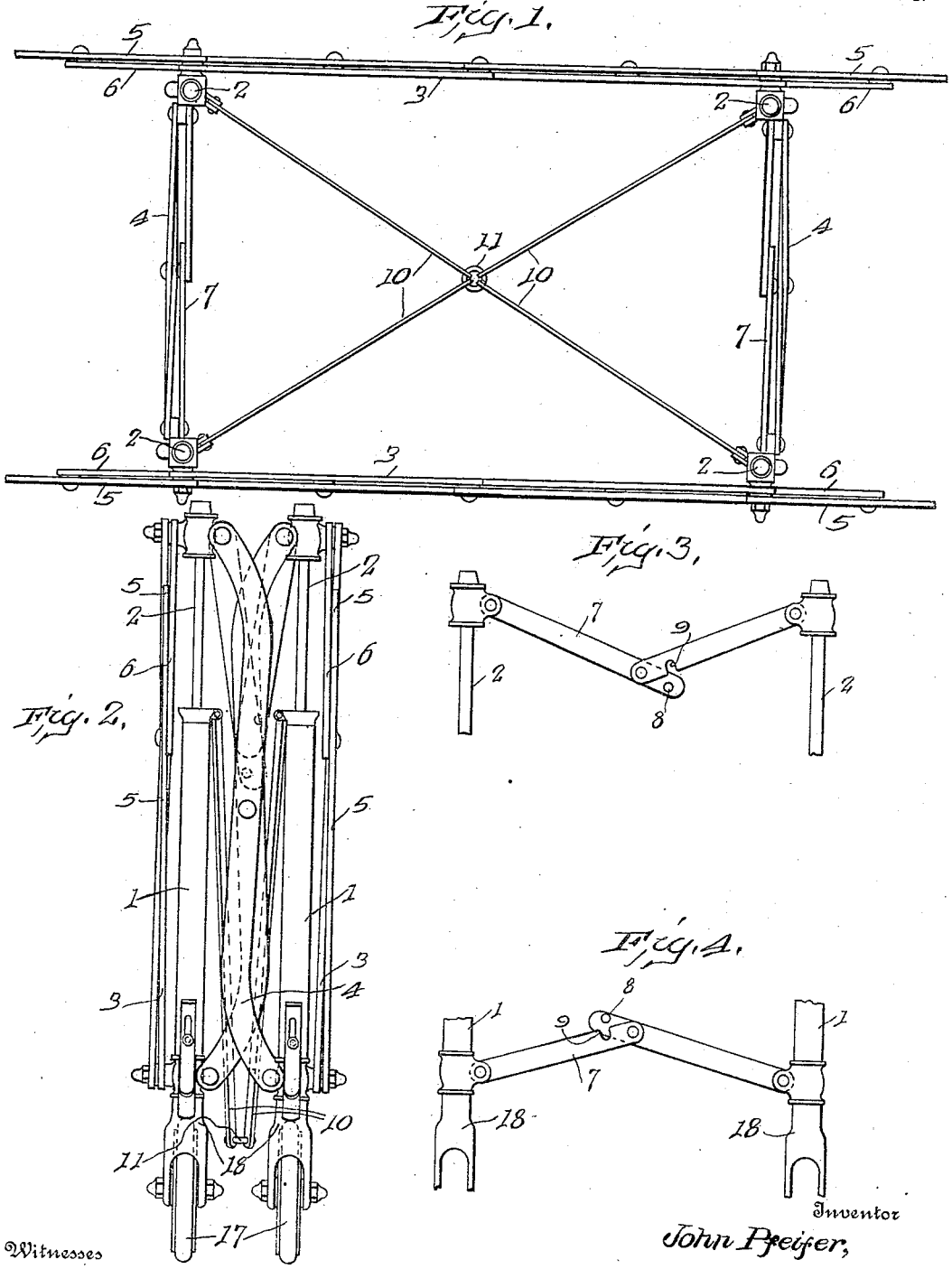

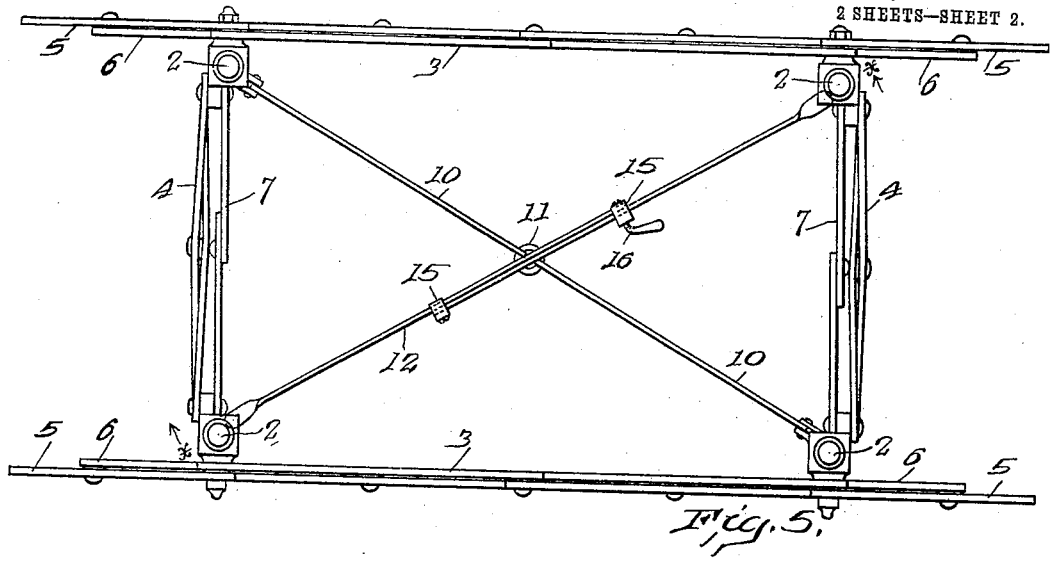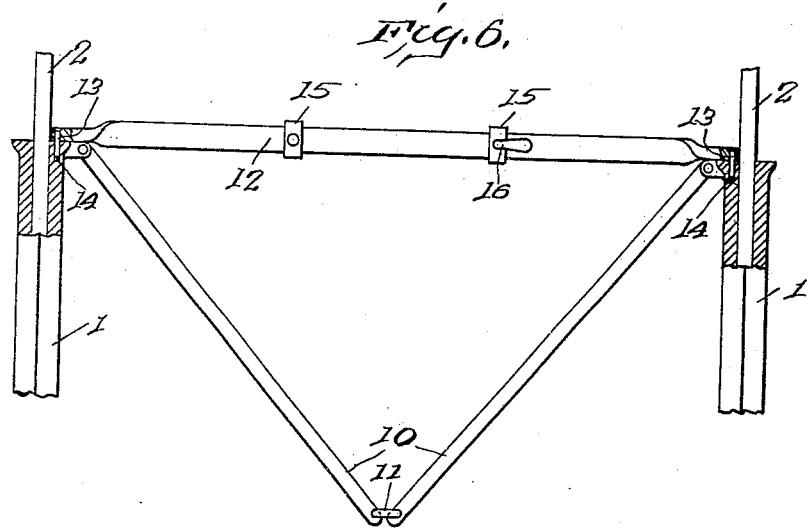

JOHN PFEIFER, OF SPRINGFIELD, OHIO, ASSIGNOR TO THE CHAMPION CHEMICAL COMPANY, OF SPRINGFIELD, OHIO, A CORPORATION OF OHIO.

CASKET-TRUCK.

948,482.  Specification of Letters Patent.  Patented Feb. 8, 1910.

Application filed March 1, 1909.  Serial No. 480,586.

*To all whom it may concern:*

Be it known that I, JOHN PFEIFER, a citizen of the United States, residing at Springfield, in the county of Clark and State of Ohio, have invented certain new and useful Improvements in Casket-Trucks, of which the following is a specification, reference being had therein to the accompanying drawings.

This invention relates to casket trucks, and the object of the invention is to provide a double folding casket truck which, when in its extended position, will have its corner posts so braced one against the other as to render the truck rigid.

To this end, it is a further object of the invention to provide the truck with both diagonal and transverse braces which, when the truck is in its extended position, coöperate to brace the several posts against movement relatively one to the other.

A further object of the invention is to provide a double folding truck with adjustable means for locking the corner posts of the truck in different positions relatively one to the other, thus rendering the truck adjustable both as to length and width and as to height.

With these objects in view my invention consists in certain novel features and in certain combinations and arrangements of parts hereinafter to be described, and then more particularly pointed out in the claims.

In the accompanying drawings, Figure 1 is a top plan view of a truck, embodying my invention, in its extended position; Fig. 2 is an end elevation of such a truck in its folded position; Fig. 3 is a fractional detail view of one end of the truck showing the transverse brace; Fig. 4 is a similar view showing a slightly modified arrangement of the transverse brace; Fig. 5 is a top plan view of a truck provided with an adjustable locking member; and Fig. 6 is a fractional, sectional view, taken on the line $x\ x$ of Fig. 5 and looking in the direction of the arrows.

In these drawings I have illustrated one embodiment of my invention and have shown the same as applied to a truck of a well known construction. The truck proper comprises four telescopic upright corner posts, each of which, in the present instance, consists of a lower fixed member 1 and an upper movable member 2 slidably mounted within the lower member. These posts are connected one to the other by means of foldable side and end frames 3 and 4, respectively, and preferably each comprising one or more pairs of intersecting bars or lazy tongs. The ends of the intersecting bars lying adjacent to the corner posts are connected thereto, the upper end of the one bar being connected to the upper or movable portion of the post and the lower end of the other bar being connected to the lower fixed portion of the post. A handle 5 is secured to each post and extends longitudinally of the truck. The lower end of this handle 5 is preferably pivotally secured to the fixed portion of the post and the upper portion of the handle is connected by means of a link 6 to the upper or movable portion of the post.

The truck so far described is, as above stated, of known construction, and, in applying my invention thereto I have inserted between each pair of end posts a foldable brace 7, which, in the present instance, consists of two members each having its outer end pivotally connected directly to the adjacent corner post and having their inner ends pivotally connected one to the other. The inner end of one of said members preferably extends beyond the point of pivotal connection to the other member and is provided with a pin or projection 8 adapted to enter a recess 9 formed in said other member and thus limit the movement of the two parts of the brace about their pivotal centers. In Figs. 1, 2 and 3 I have shown this brace 7 as having its outer ends pivotally connected directly to the upper ends of the movable portions of the corner posts, but obviously the brace could be connected at different points between the tops and the bottoms of said posts, and, in Fig. 4, I have shown a slightly modified arrangement of the brace in which the outer ends thereof are pivotally connected directly to the lower or fixed member of the posts near the lower ends thereof. When the truck is in its extended position the two members of the brace 7 are moved into alinement one with the other and the length of the brace as a whole is such that, when moved into this position, the brace will exert a certain amount of pressure upon each post and will thus form a rigid connection between the same, effectually preventing lateral movement of either relatively to the other. When it is desired to fold the truck the inner ends of the two members of the foldable brace are moved out of alinement with the end members thereof, thus breaking the brace and permitting the two members thereof to fold as the two end posts are moved toward each other.

In order to hold the corner posts at one end of the truck against movement either laterally or longitudinally relatively to the corner posts at the other end of the truck I have provided suitable diagonal braces 10 which extend diagonally of the truck and are connected at their opposite ends to diagonally opposite corner posts. I have, in the present instance, shown two of these diagonal braces, each of which comprises two members having their outer ends pivotally connected to diagonally opposite corner posts and having their inner ends pivotally connected one to the other. The outer ends of these braces may be connected to their respective corner posts at any suitable point, but I have, in the present instance, shown the same as pivotally connected directly to the upper end of the fixed portion of the post. The pivotal connection between the inner ends of the two members of each brace is here shown as formed by a ring 11 which extends through the inner ends of the two members of the brace. When the truck is fully extended the two members of the brace 10 and the ring 11 will lie in substantial alinement and will form a practically rigid brace which will tend to prevent the movement of the posts connected thereto either toward or away from each other. In the present instance I have shown the inner ends of the four members comprising the two braces as connected one to the other by a single ring 11, thus simplifying the construction and enabling the two diagonal braces to lie in the same horizontal plane. When the truck has been fully extended and the transverse braces 7 moved into their operative positions, thereby placing the corner posts at each end of the truck under tension, the two members of each diagonal brace will be moved into substantial alinement one with the other and will form a practically rigid connection between the four corner posts, thereby rigidly bracing the corner posts of the truck against movement relatively one to the other. When the transverse brace 7 between the end posts has been broken to enable the end posts to be moved together, the tension on the end posts will be relieved and the inner ends of the two members of each diagonal brace will drop slightly, thus moving the inner ends thereof out of alinement with the outer ends thereof and permitting the two members of each brace to fold upon themselves as the corner posts of the truck are moved toward a common center. Thus, it will be apparent that the combination of the diagonal and the transverse braces renders the truck very rigid when in its extended position, the transverse braces serving, as above explained, to so extend the posts as to support the diagonal braces in such a position as to form a substantially rigid connection between the posts.

In order that the truck may be used with caskets of different sizes it is necessary to provide some means for securing the posts in different positions relatively one to the other, thus enabling the truck to be locked in a partially folded position, and not only varying the length and width of the truck, but increasing its height. To accomplish this result I have provided an adjustable locking member 12 which is adapted to be secured to two of the corner posts of the truck, and, when the truck has been folded to the desired extent, this adjustable member is locked against further movement and the members of the truck are thus secured in the desired position. This adjustable connecting member preferably comprises two bars having their inner ends slidably connected one to the other and each having its outer end adapted to be connected to one of the corner posts. In the present instance the outer ends of the two bars forming the locking member are provided with pins 13 adapted to enter recesses 14 formed in the corner posts, while the inner end of each bar is provided with a guide or collar 15 which is rigidly secured thereto and is adapted to receive the adjacent portion of the other bar. One of these guides is provided with a set screw 16 extending through the same and adapted to engage that bar which extends loosely through the collar and thus secure together the two bars forming the locking member and forming a rigid connection between the two ends of the posts to which the outer ends of the bars are connected. While this locking member may be secured to any two of the posts I have here shown the same as extending diagonally of the truck and having its ends secured to the diagonally opposite posts. This arrangement of the locking member not only secures the truck in its partially folded position, but also forms a brace for bracing the members against movement relatively one to the other, this being a desirable feature inasmuch as, when the truck is in its partially folded position, the braces 7 and 10 are inoperative. Likewise, the outer ends of the two bars forming the locking member may be secured to the adjacent corner post in any suitable manner, but, in the present instance, I have shown the recess 14 as arranged vertically in the upper end of the fixed portion of the post, as shown in Fig. 6.

The corner posts of the truck may be supported in any suitable manner, but I have here shown these posts as mounted upon swiveled caster wheels, each of which comprises a roller or wheel 17 journaled between the arms of a yoke 18, the upper portion of which is pivotally connected to the lower end of the post.

The manner of manipulating the truck will be readily understood from the foregoing description and it will be apparent that, when this truck is in its extended position, the several members thereof are rigidly held against movement relatively one to the other and the truck will be locked in its adjusted position. It will also be apparent that this adjustable locking member is of such a construction that the truck can be extended or folded to any desired extent.

I wish it to be understood that I do not desire to be limited to the details of construction shown and described, for obvious modifications will occur to a person skilled in the art.

Having thus fully described my invention, what I claim as new and desire to secure by Letters Patent, is:—

1. A casket truck comprising corner posts, foldable side and end frames connecting said posts, each member of each of said frames having its upper end pivotally mounted on one of said corner posts, and braces comprising two members operatively connected one to the other at their inner ends and each having its outer end pivoted to one of said corner posts.

2. A casket truck comprising corner posts, foldable side and end frames connecting said posts, a brace comprising two members operatively connected one to the other at their inner ends and each having its outer end pivoted to one of said corner posts, and means for limiting the movement of the two members of said brace about their pivotal centers.

3. A casket truck comprising telescopic corner posts, end and side frames of intersecting bars connecting said corner posts one to the other, each bar of each of said end frames having its upper end pivotally mounted on the movable member of one of said corner posts, and a brace comprising two members having their inner ends pivotally connected one to the other and each having its outer end pivoted to the movable member of one of said telescopic posts.

4. A casket truck comprising telescopic corner posts, foldable side and end frames for connecting said corner posts one to another, a brace extending diagonally of said truck and comprising two rigid members, each pivotally connected at its outer end to one of the members of one of said telescopic posts, means for pivotally connecting the inner ends of said rigid members one to the other, and means including a brace for exerting pressure between said corner posts, thereby placing said diagonal brace under tension.

5. A casket truck comprising telescopic corner posts, foldable side and end frames for connecting said posts one to another, two diagonal braces, each comprising two rigid members, each of said rigid members having its outer end pivotally connected to one of said posts, a ring extending through the inner end of each of said rigid members, whereby, when said truck is fully extended, the two rigid members for each of said braces and said connecting ring will be arranged in substantial alinement and means including a brace for exerting pressure between said corner posts to place said diagonal braces under tension.

6. In a casket truck, the combination, with corner posts, and foldable side and end frames for connecting said corner posts one to another, of a diagonal brace having its outer ends connected to diagonally opposite corner posts, and a foldable transverse brace having its outer ends connected to the two posts at one end of said truck.

7. In a casket truck, the combination, with corner posts, and foldable side and end frames connecting said posts one to another, of foldable diagonal braces arranged at an angle one to the other and each having its outer ends connected to diagonally opposite corner posts, and foldable transverse braces extending between the two end posts at each end of said truck.

8. In a casket truck, the combination, with corner posts, and foldable side and end frames connecting said posts one to another, of foldable diagonal braces arranged at an angle one to the other and each having its outer ends connected to diagonally opposite corner posts, and a foldable brace arranged at each end of said truck comprising two members having their inner ends pivotally connected one to the other and each having its outer end connected to one of the posts of said truck.

9. In a casket truck, the combination, with telescopic corner posts, and foldable side and end frames for connecting said posts one to another, of braces extending diagonally of said truck and arranged at an angle one to the other and each comprising two rigid members, the outer end of each of said rigid members being pivotally connected to one of said corner posts, a ring extending through the inner ends of each member of both of said braces, and a foldable transverse brace arranged at each end of said truck and comprising two members having their inner ends pivotally connected one to the other and each having its outer end connected to one of said corner posts.

10. In a casket truck, the combination, with telescopic corner posts, and foldable side and end frames for connecting said posts one to another, of a pair of diagonal braces each comprising two members, the two members of each brace having their inner ends pivotally connected one to the other and each member having its outer end pivotally connected to the fixed portion of the respective post near the upper end thereof, and a transverse brace arranged at each end of said truck and each comprising two members having their inner ends pivotally connected one to the other and having its outer end pivoted to the upper end of the movable member of the respective corner post.

11. The combination, with a foldable casket truck comprising corner posts and extensible side and end members connecting said posts one to another, of adjustable means for locking said truck in a partially folded position.

12. The combination, with a foldable casket truck comprising corner posts and extensible side and end members connecting said posts one to another, of an adjustable locking member adapted to be secured to two of said corner posts to secure said truck in a partially folded position and to brace said posts against movement relatively one to another.

13. The combination, with a foldable casket truck comprising corner posts and extensible side and end members connecting said posts one to another, of a locking member comprising two bars having their inner ends slidably connected one to the other and having their outer ends connected to two of said corner posts, and means for locking said members in their adjusted position.

14. The combination, with a foldable casket truck comprising corner posts and extensible side and end members connecting said posts one to another, of a locking member arranged diagonally of said truck and comprising two bars having their inner ends slidably connected one to the other and having their outer ends connected to diagonally opposite corner posts.

15. The combination, with a foldable casket truck comprising corner posts and extensible side and end members connecting said posts one to another, of a locking member comprising two bars each having a guide rigidly secured thereto and adapted to receive the other member and each having its outer end connected to one of said corner posts, and means carried by one of said guides for locking said bars against movement relatively one to the other.

16. In a casket truck, the combination, with telescopic corner posts, foldable end and side frames connecting said corner posts one to the other, foldable braces extending diagonally of said truck and having their ends pivoted to the respective corner posts and other foldable braces extending transversely to said truck and having their ends pivoted to the respective corner posts, said transverse and diagonal braces serving to fully brace the truck in its extended position, of an adjustable brace extending between two of said corner posts, and means for locking said brace in its adjusted position, said adjustable brace serving to rigidly brace said truck in a partially folded position, thereby decreasing the length and width of the truck and increasing the height thereof.

17. In a casket truck, the combination, with telescopic corner posts, foldable end and side frames connecting said corner posts one to the other, foldable braces extending diagonally of said truck and having their ends pivoted to the respective corner posts, and other foldable braces extending transversely to said truck and having their ends pivoted to the respective corner posts, said transverse and diagonal braces serving to fully brace the truck in its extended position, of an adjustable brace extending diagonally of said truck, means for connecting said brace to two of said corner posts, and means for locking said brace in its adjusted position, whereby said adjustable brace serves to rigidly brace said truck in a partially folded position, thereby decreasing the length and width of the truck and increasing the height thereof.

In testimony whereof, I affix my signature in presence of two witnesses.

JOHN PFEIFER.

Witnesses:
   J. Fred Anderson,
   Edward L. Reed.